US010789382B2

(12) United States Patent
Marcinowski

(10) Patent No.: US 10,789,382 B2
(45) Date of Patent: *Sep. 29, 2020

(54) SYSTEMS AND METHODS OF PROVIDING ACCESS TO SECURE DATA

(71) Applicant: Capital One Services, LLC, McLean, VA (US)

(72) Inventor: Timothy Russell Marcinowski, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/429,317

(22) Filed: Jun. 3, 2019

(65) Prior Publication Data
US 2019/0286836 A1 Sep. 19, 2019

Related U.S. Application Data

(63) Continuation of application No. 16/109,853, filed on Aug. 23, 2018, now Pat. No. 10,325,111, which is a
(Continued)

(51) Int. Cl.
G06F 21/62 (2013.01)
G06F 21/31 (2013.01)
H04L 29/08 (2006.01)
G06F 21/60 (2013.01)
G06F 21/53 (2013.01)

(52) U.S. Cl.
CPC .......... G06F 21/6218 (2013.01); G06F 21/31 (2013.01); G06F 21/53 (2013.01); G06F 21/604 (2013.01); G06F 21/629 (2013.01); H04L 67/1008 (2013.01); H04L 67/1019 (2013.01); H04L 67/32 (2013.01); H04L 67/34 (2013.01)

(58) Field of Classification Search
CPC .................................................... G06F 21/6218
See application file for complete search history.

(56) References Cited

U.S. PATENT DOCUMENTS 7,110,982 B2 9/2006 Feldman et al.
8,959,579 B2 2/2015 Barton et al.
(Continued)

OTHER PUBLICATIONS

Butler, Brandon, "What is Amazon cloud's Lambda and why is it a big deal,?" NetworkWorld, Apr. 7, 2016, 4 pages.
(Continued)

Primary Examiner — William S Powers
(74) Attorney, Agent, or Firm — Troutman Pepper Hamilton Sanders LLP; Christopher J. Forstner; John A. Morrissett

(57) ABSTRACT

The disclosed technology includes techniques for secure access to data associated with an organization and includes providing a user device access to a user interface that is configurable by a user of the user device to execute function requests. Upon receipt of a function request, a router can randomly select an available computer from a computer cluster to execute the function. The computer can access a predetermined portion of the organization's data, generate an output by executing the requested function based on the predetermined portion of the organization's data, and transmit the output to the user device.

20 Claims, 6 Drawing Sheets

Related U.S. Application Data continuation of application No. 15/875,534, filed on Jan. 19, 2018, now Pat. No. 10,121,020.

(56) References Cited

U.S. PATENT DOCUMENTS

| | | | |
|---|---|---|---|
| 2002/0138582 A1* | 9/2002 | Chandra | G06Q 10/10 709/206 |
| 2003/0152207 A1* | 8/2003 | Ryan | H04M 3/42153 379/201.04 |
| 2006/0135141 A1* | 6/2006 | Wilson | H04M 1/72525 455/418 |
| 2013/0091543 A1 | 4/2013 | Wade et al. | |
| 2013/0318630 A1 | 11/2013 | Lam | |
| 2017/0344397 A1* | 11/2017 | Barsness | G06F 9/5066 |
| 2018/0113738 A1 | 4/2018 | Nichols et al. | |
| 2018/0133738 A1* | 5/2018 | Endo | B05B 3/02 |

OTHER PUBLICATIONS

Peng, Z. et al., "Random task scheduling scheme based on reinforcement learning in cloud computing," Cluster Computing, Sep. 2015, 14 pages.

* cited by examiner

SYSTEMS AND METHODS OF PROVIDING ACCESS TO SECURE DATA

CROSS-REFERENCE TO RELATED APPLICATIONS

This application is a continuation application under 35 U.S.C. § 120 of U.S. patent application Ser. No. 16/109,853, filed Aug. 23, 2018, which is a continuation application of U.S. patent application Ser. No. 15/875,534, filed Jan. 19, 2018, now U.S. Pat. No. 10,121,020, the contents of which are hereby incorporated by reference in their entirety as if fully set forth herein.

BACKGROUND

Some organizations may provide access to its data stored by the organization to certain third parties, and in some scenarios, the organization's data may include sensitive or confidential information. For example, a financial institution may desire to provide access to a large amount of financial records or other data to certain affiliates or merchants. Because the data may be sensitive or confidential, the organization may desire to permit the third party to perform functions, computations, or other actions to the data while the organization maintains control of its data such that, for example, the third party is unable to directly view or copy the organization's data. To accomplish this, an organization typically must create a separate and distinct application programming interface (API) that is tailored to the needs of each individual third party and that grants access to the organization's data. As development of each API generally takes upwards of two to six months, this can be an expensive and time-consuming undertaking. Adding to the frustration that comes with such API development can be the potential for miscommunication of the third party's needs during development or the shifting of the third party's needs during or after initial development, which may require the organization to redevelop certain aspects of the API.

To alleviate the burden on the organization, solutions may be designed that provide various third parties with the ability to perform functions, computations, calculations, or other actions to an organization's data while permitting the organization to maintain full ownership and control of its data and while reducing or eliminating the need for the organization to develop a unique API for each individual third party.

SUMMARY

The above needs and others may be addressed by certain embodiments or embodiment of the disclosed technology. Certain embodiments include techniques for providing, to a third party, secure access to data associated with an organization.

Some embodiments can include a method for providing secure access to organization data associated with an organization, and the method can comprise providing a user interface that can be accessible by a user device and that can enable the user device to transmit computer-executable instructions to a storage device associated with the organization and can enable the user device to request execution of at least some of the computer-executable instructions. The user interface can be stored on a storage device associated with the organization. The method can also include receiving, at the storage device and via the user interface, the computer-executable instructions from the user device; saving the computer-executable instructions at the storage device; and receiving, at the web server and from the user device via the user interface, a request to execute at least some of the computer-executable instructions in relation to a portion of the organization data. The organization data can be stored on the storage device. The method can also include, responsive to receiving the request, scheduling, by a router, a working computer from a computer cluster associated with the organization to perform the at least some of the computer-executable instructions. The scheduling can comprise identifying a plurality of available computers in the computer cluster, where an available computer can be a computer that has available RAM, available processing, and available cycles and is capable of managing an additional concurrent connection. The scheduling can also comprise randomly selecting the working computer from the plurality of available computers of the computer cluster. After the scheduling, the method can further include accessing, by the working computer and from the storage device, the at least some of the computer-executable instructions and at least some of the portion of the organization data; executing, by the working computer, the at least some of the computer-executable instructions based on the at least a portion of the organization data to generate an output; and transmitting the output from the working computer and to the user device via the web server.

In some embodiments, the method can further comprise determining the portion of the organization data based on permissions associated with a user account associated with the user device and preventing the user device from requesting execution of the at least some of the computer-executable instructions in relation to any organization data other than the portion of the organization data.

In some embodiments, the portion of the organization data can comprise verifying authentication information received from the user device, where the authentication information can be associated with the user account.

In some embodiments, the method can further comprise requesting the authentication information from the user device and receiving the authentication information from the user device.

In some embodiments, the portion of the organization data can be a first data tier of a plurality of data tiers.

In some embodiments, the first data tier can comprise confidential data of the organization data.

In some embodiments, the first data tier can comprise nonconfidential data of the organization data.

In some embodiments, the first data tier of the plurality of data tiers can be accessible by user devices associated with each user account of a first plurality of user accounts and a second data tier of the plurality of data tiers can be accessible by user devices associated with each user account of a second plurality of user accounts.

According to some embodiments, a system can provide secure access to secure data associated with an organization, and the system can comprise a storage device storing raw user data associated with the organization, the raw user data and logic associated with a user account. The raw user data can be a predetermined portion of the secure data that can be predetermined based at least in part on permissions associated with a user account, and the raw user data can be accessible by each computing device of the cluster of computing devices. The system can also include a cluster of computing devices associated with the organization, where each computing device of the cluster of computing device can be in communication with the storage device, and a user interface configured to receive a function request from a user device associated with the user account. The user device can be remotely located, and the function request can be indicative of a request to execute a function based on at least some of the logic and in relation to at least some of a raw user data. The system can also include a scheduler configured to, upon receipt of a function request from the user device and at the web server via the user interface, randomly select a scheduled computing device from the cluster of computing devices to perform the function request. The scheduling can comprise identifying a plurality of available computing devices of the cluster of computing devices, where an available computing device can be a computing device that has available RAM, has available processing units, has available cycles or available tasks, and is capable of managing an additional concurrent connection; and the scheduling can comprise randomly selecting the scheduled computing device from the plurality of available computing devices. The scheduled computing device can be configured to execute the requested function based at least in part on at least some of the logic and at least some of the raw user data to generate an output, the user account can be of a plurality of user accounts, and a processing power of each computing device of the cluster of computing devices can be partitioned into a plurality of processing units, where each processing unit of the plurality of processing units can be assigned to a corresponding user account of the plurality of user accounts.

In some embodiments, each processing unit of the plurality of processing units can have an approximately equal size.

In some embodiments, the processing units of the plurality of processing units can have different sizes.

In some embodiments, a first storage device associated with the organization can comprise the raw user data, a second storage device associated with the organization can comprise the logic, and the second storage device can be separate from the first storage device.

In some embodiments, the user device can be a first user device, the user account can be a first user account, and each available computing device of the plurality of available computing devices can be configured to concurrently execute a first function request from the first user device associated with the first user account and a second function request from a second user device associated with a second user account of the plurality of user accounts.

In some embodiments, each available computing device of the cluster of computing devices can be configured to concurrently execute the first function request using a first processing unit of the plurality of processing units, where the first processing unit is assigned to the first user account, and the second function request using a second processing unit of the plurality of processing units, where the second processing unit is assigned to the second user account.

According to some embodiments, a system can provide secure access to secure data associated with an organization, and the system can comprise an organization network associated with the organization. The network can comprise a cluster of computing devices and a memory storing raw user data. The raw user data can be a predetermined portion of the secure data that is predetermined based at least in part on permissions associated with a user account and can be accessible by each computing device of the cluster of computing devices. The system can also include a user interface stored on a web server associated with the organization, and the user interface can comprise an upload functionality through which instructions may be received at the organization network from a user device associated with the user account. The user device can be located outside of the organization network, and the instructions can comprise computer code indicative of one or more functions to be performed on at least some of the raw user data. The user interface can also comprise a request functionality through which the user device can request a function to be performed based at least in part on at least some of the instructions and at least some of the raw user data. The system can also include a router configured to receive, from the user device and via the user interface and the web server, one or more function requests, and the router can be configured to schedule a working computer to execute the one or more requested functions by identifying a plurality of available computers of the computer cluster, where an available computer is a computer that has available RAM, has available processing power, has available cycles, and is capable of managing an additional concurrent connection. The router can also be configured to schedule a working computer to execute the one or more requested functions by, for each individual requested function of the one or more requested functions, randomly selecting a working computer from the plurality of available computers of the computer cluster to perform the function request of the one or more function requests of the instructions, where each computing device of the cluster of computing devices can be configured to execute the one or more requested functions and provide an output to the user device and via web server and the user interface.

In some embodiments, the router can be configured to randomly select a first computing device of the cluster of computing devices to perform a first function request of the one or more function requests and randomly select a second computing device of the cluster of computing devices to perform a second function request of the one or more function requests, and the second computing device can be different from the first computing device.

In some embodiments, the router can be configured to select a single computing device of the cluster of computing devices to perform all function requests of the one or more function requests.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
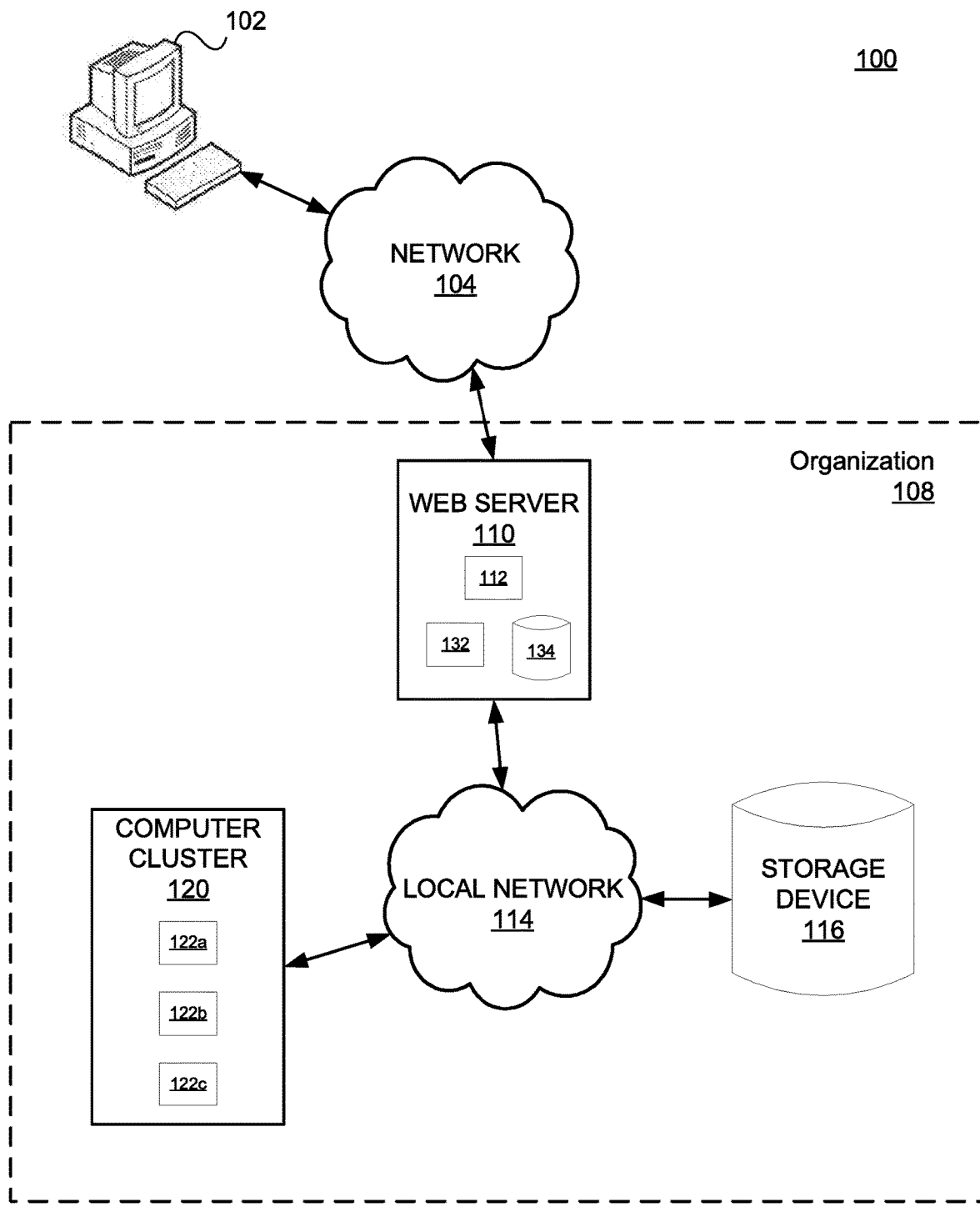
FIG. 1 is a diagram of an example system that may be used to provide, to a third party, secure access to data associated with an organization, according to some embodiments of the disclosed technology.

Embodiments of the disclosed technology include novel techniques for providing, to a third party, secure access to data associated with an organization. According to certain embodiments, a user interface may be provided, which may enable a third party to perform functions, computations, or other actions on secure data that is owned, controlled, and/or hosted by an organization. Thus, the third party may be enabled to perform functions, computations, calculations, or other actions based on the secure data without the organization ever relinquishing control of the data and without permitting the third party to directly view or copy the data. Various techniques for achieving this functionality are described below.

Throughout this disclosure, certain embodiments are described in exemplary fashion. However, embodiments of the disclosed technology are not limited to the example embodiments discussed herein. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one implementation," "an implementation," "example implementation," "some embodiments," "certain embodiments," "various embodiments," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

In some instances, a computing device may be a processor, controller, or a central processing unit (CPU). In yet other instances, a computing device may be a set of hardware components. Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the internet or a local area network (LAN). Of course, a person of ordinary skill in the art will recognize many modifications may be made to this configuration without departing from the scope or spirit of the claimed subject matter.

Various embodiments of the disclosed technology now be described with reference to the accompanying figures. Wherever convenient, the same references numbers will be used throughout the drawings to refer to the same or like parts.

FIG. 1 is a diagram of an example system 100 that may be configured to perform one or more processes for providing, to a third party, secure access to data associated with an organization. The components and arrangements shown in FIG. 1 are not intended to limit the disclosed embodiments as the components used to implement the disclosed processes and features may vary. As shown, system 100 may include one or more user devices 102, a network 104, and an organization 108 including, for example, a web server 110 including a router 112, a local network 114, a storage device 116, and a computer cluster 120.

In some embodiments, a user device 102 may be associated with a user account. In some embodiments, the user account may be associated with more than one user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 104 and ultimately communicating with one or more components of organization 108. In some embodiments, a user device may include or incorporate electronic communication devices for hearing or vision impaired users. User device 102 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 104 may be of any suitable type, including individual connections via the internet such as cellular or WiFi networks. In some embodiments, network 104 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 104 may comprise any type of computer networking arrangement used to exchange data. For example, network 104 may be the Internet, a private data network, virtual private network using a public network, and/or other suitable connection(s) that enables components in system environment 100 to send and receive information between the components of system 100. Network 104 may also include a public switched telephone network ("PSTN") and/or a wireless network.

Organization 108 may be associated with an entity such as a business, corporation, individual, partnership, or any other entity that provides one or more of goods, services, and consultations to individuals such as customers.

Organization 108 may include one or more servers, devices, and computer systems for performing one or more functions associated with products and/or services that organization 108 provides. Such servers, devices, and computer systems may include, for example, web server 110, router 112, storage device 116, and computer cluster 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and/or added to) via local network 114 and/or network 104 by one or more devices of system 100. According to some embodiments, web server 110 may receive computer-executable instructions from user device 102 or from a database associated with user device 102. According to some embodiments, web server 110 may receive a request from user device 102 to execute one or more functions based on at least some of the computer-executable instructions and at least some of data associated with organization 108. According to some embodiments, web server 110 may provide or enable a communication link between router 112 and a user device 102 and/or computer cluster 120 and a user device 102, such as, for example, to relay function requests or outputs from executed functions.

Router 112 may include one or more devices configured to, upon receiving one or more function requests from user device 102, select or schedule one or more computers 122 from computer cluster 120 to execute the one or more function requests. According to some embodiments, router 112 may incorporate some or all parts or elements of user device 102, as described above, or computers 122, as described below. In some embodiments, router 112 may track and maintain a record of the status of some or all computers 122 of computer cluster 120. In some embodiments, router 112 may query the status of some or all computers 122 when router 112 receives notification that a user device 102 has requested execution of a function. In certain embodiments, router 112 may receive requests from user device 102 and, after selecting one or more computers 122 to execute the requested function, may transmit the requested function to the one or more computers 122. In some embodiments, another element of organization 108's system (for example, web server 110) may receive requests from user device 102 and may notify router 112, at which time router 112 may select or schedule one or more computers 122 to execute the requested function. Router 112 may then notify the appropriate element or device associated with organization 108's system (for example, web server 110), which may then transmit the requested function to the selected computer(s) 122. In some embodiments, router 112 may comprise a scheduler. In certain embodiments, router 112 and the scheduler may be separate, distinct devices. In some embodiments, router 112 and/or the scheduler may be components of web server 110. In some embodiments, router 112 and/or the scheduler may be distinct devices separate from, but in electrical communication with, web server 110. In some embodiments, router 112 is configured to call the scheduler to determine whether an available or "healthy" computer 122 is available. In some embodiments, the scheduler may be configured to determine whether an available or "healthy" computer 122 is available and, upon selecting an available computer 122, the scheduler may communicate to router 112 which computer 122 has been selected. Router 112 may be configured to then route the requested function to the selected computer 122.

Local network 114 may comprise any type of computer networking arrangement used to exchange data in a localized area, such as WiFi, Bluetooth™ Ethernet, and other suitable network connections that enable components of organization 108 to interact with one another and to connect to network 104 for interacting with components in system environment 100. In some embodiments, local network 114 may comprise an interface for communicating with or linking to network 104. In other embodiments, components of organization 108 may communicate via network 104, without a separate local network 114.

Storage device 116 may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage device 116, which may comprise a machine-readable storage medium.

According to some embodiments, storage device 116 may be a database associated with organization 108 and/or its related entity that may store a variety of information relating to customers, transactions, customer information, and business operations. Storage device 116 may also serve as a back-up storage device and may contain data and information that is also stored on, for example, local databases or other storage devices associated with web server 110, router 112, and/or computers 122 of computer cluster 120. Storage device 116 may be accessed by other devices and may be used to store records of past interactions, communications, and/or transactions that a particular customer has had with organization 108 and/or its related entity. Further, in some embodiments, storage device 116 may be used to store customer data and customer account information such as customer identification information (e.g., name, address(es), phone number(s), and the like), account numbers, balances, payment history, etc.

Figure 2:
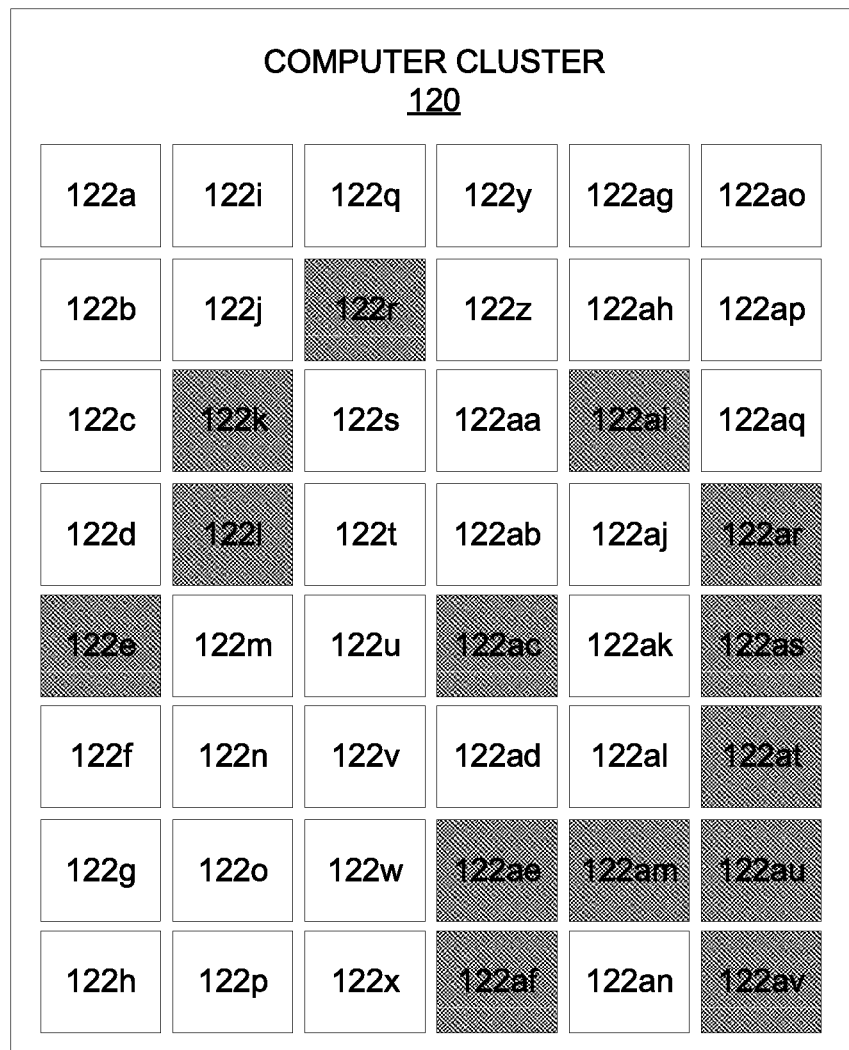
FIG. 2 is a diagram of a computer cluster, according to some embodiments of the disclosed technology.
Figure 3:
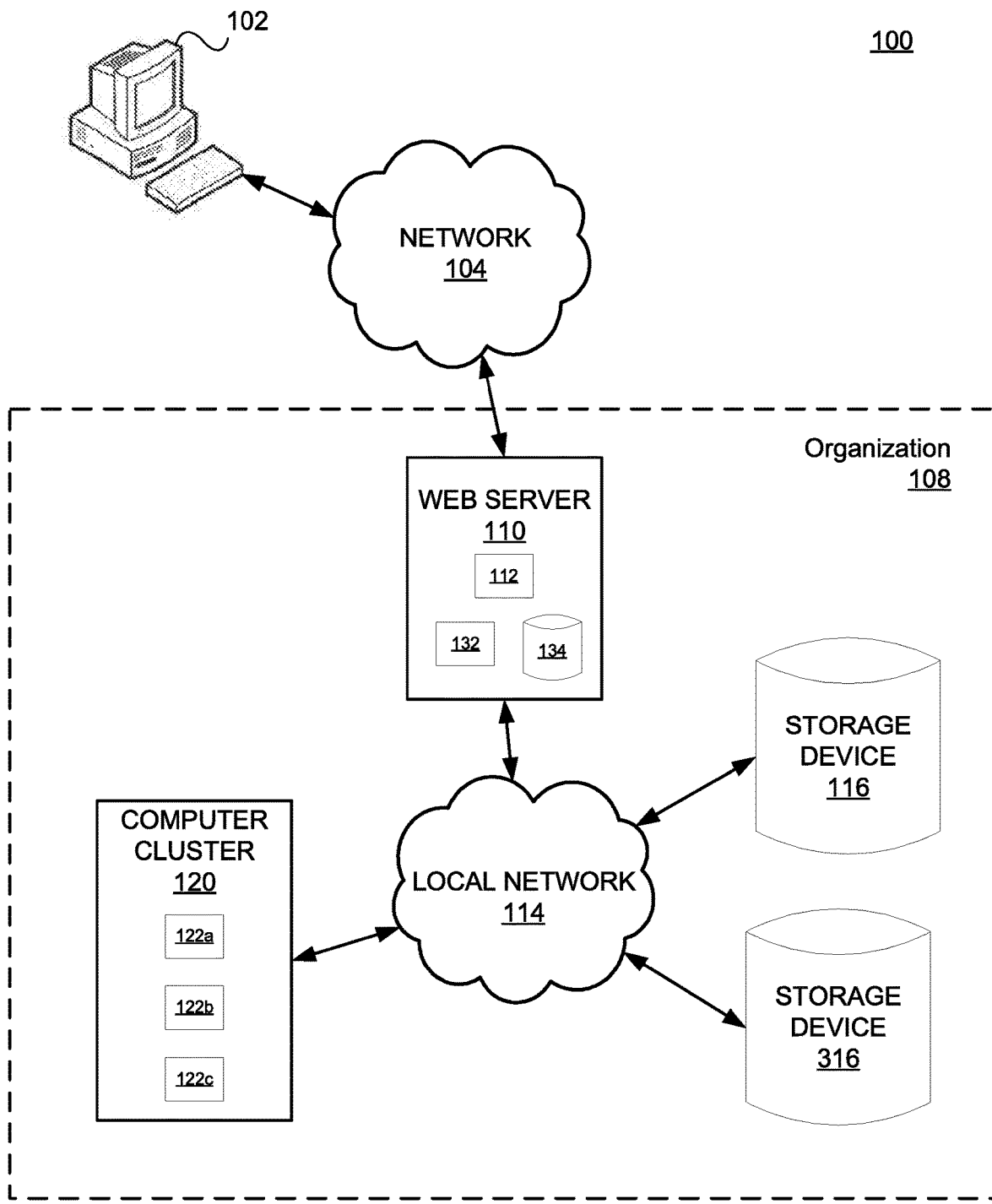
FIG. 3 is a diagram of an example system that may be used to provide, to a third party, secure access to data associated with an organization, according to some embodiments of the disclosed technology.
Figure 4:
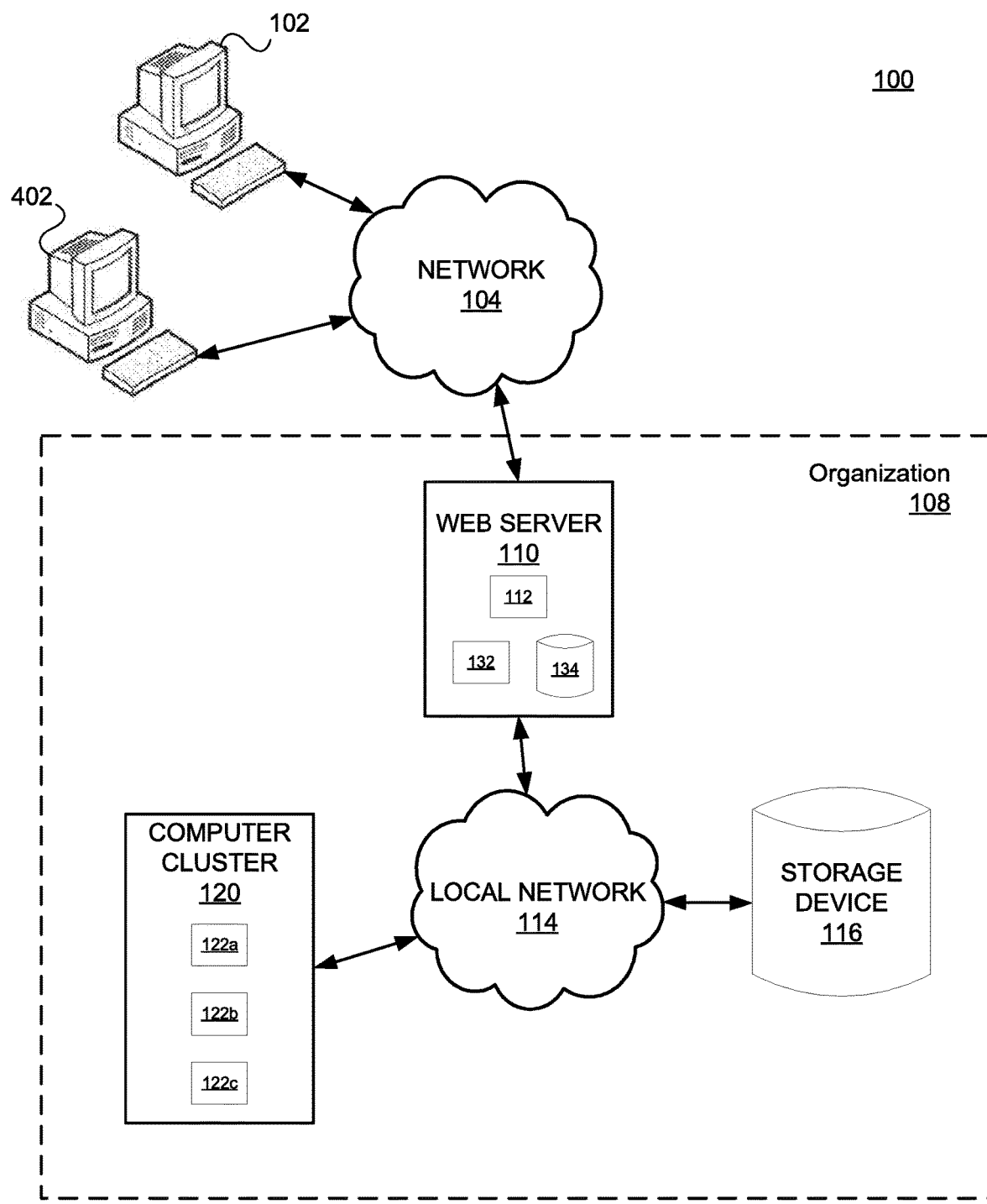
FIG. 4 is a diagram of an example system that may be used to provide, to multiple third parties, secure access to data associated with an organization, according to some embodiments of the disclosed technology.

Computer cluster 120 may comprise a plurality of computing devices or computers 122. (For example, computers 122a-122c are depicted in FIGS. 1, 3, and 4 and computers 122a-122av are depicted in FIG. 2. Computers of computer cluster 120 are collectively referred to as computers 122 herein.) According to some embodiments, the terms computing device or computer 122, as used herein, may be a CPU, or conceptualized as a CPU. According to some embodiments, each computer 122 may have an appropriate structure to be a computer processor. In some embodiments, each computer 122 may include more than one processing unit. As used herein, "processing unit" may refer to a CPU or may refer to another processing unit, such as a graphical processing unit (GPU), for example. Each computer 122 may be configured to load computer-executable process steps from storage device 116, 316 (e.g., the stored logic associated a user account) into a field of the RAM in order to, for example, execute software programs. Data may be stored in the RAM, where the data may be accessed by computer 122 during execution.

Although the preceding description describes various functions of a web server 110, router 112, storage device 116, and computer cluster 120, in some embodiments, some or all of these functions may be carried out by a single computing device. For example, in some embodiments, all of the functions of web server 110, router 112, and/or computer cluster 120 may be carried out by a single device.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

In some embodiments, organization 108 may provide a user interface. In some embodiments, the user interface may include a graphical user interface (GUI). In some embodiments, the user interface may be located on web server 110. In some embodiments, the user interface may be located on a storage device associated with the organization. In certain embodiments, the user interface may be located on a storage device that is a part of, or is in electrical communication with, web server 110. For example, in some embodiments, the user interface may be saved as data in one or more web databases 134. In certain embodiments, web server 110, via the user interface, may be configured to receive one or more computer programs, computer scripts, tools, raw computer code, or other logic (collectively, logic) from user device 102 such that the logic can be transferred to organization 108's input/output (I/O) system. In some embodiments, the logic can be uploaded to organization 108's I/O system via user device 102 and web server 110 from a database associated with the user account associated with user device 102. In certain embodiments, the logic may be of any computer language desired by the user. In some embodiments, the uploaded logic may be saved on storage device 116 of organization 108. Persons of skill in the art will appreciate that storage device 116 may refer to a single memory device, such as a hard drive, but may also collectively refer to multiple, separate memory devices in communication with one another and/or local network 114. In certain embodiments, the saved logic of the user may be saved on a shared memory segment of storage device 116 such that each computer 122 in computer cluster 120 can access the user's saved logic. In some embodiments, web server 110, via the user interface, is configured to receive function requests from user device 102.

According to some embodiments, the user may be permitted, by organization 108, to perform functions, computations, calculations, or other actions to data owned, hosted, or otherwise controlled by organization 108. In some embodiments, the data may be secure and/or confidential data, and organization 108 may desire or may be required by law to maintain the confidentiality of the secure data. Thus, organization 108 may desire to permit a third party, such as the user via user device 102, to request the performance of functions or other actions based on the secure data without permitting user device 102 direct access to view or copy the secure data. In some embodiments, organization 108 may store some or all of the secure data on storage device 116.

In some embodiments, organization 108 may desire to permit a user device 102 associated with a particular user account to request the performance of functions on only a limited portion of the secure data. In some embodiments, organization 108 may create multiple tiers of data where only certain user accounts (and corresponding user devices 102) are permitted to request the performance of functions on certain tiers of data. In some embodiments, the tiers may be structured based on the type of data, value or marketability of data, or any other desired basis. In some embodiments, organization 108 may control and/or limit how or to what extent a user device 102 associated with a particular user account can view and/or request the performance functions on the secure data accessible by the user. Viewability of the secure data, for example, may be based on the nature of the data (e.g., the level of confidentiality associated with the secure data). In some embodiments, a user device 102 associated with a particular user account may be permitted to view secure data having a low level of sensitivity or confidentiality, while the user may not be permitted to view highly confidential data. In some embodiments, a user device 102 associated with a particular user account may be prohibited from performing certain functions while being permitted to perform other functions.

In certain embodiments, user device 102 may request a function or other action to be performed based on the secure data. In some embodiments, the function or other action may be performed at least in part by utilizing the logic uploaded to storage device 116 via user device 102 and web server 110. In some embodiments, a function request may be received by router 112 from user device 102 via network 104. In certain embodiments, a function request may be received by router 112 from user device 102 via network 104 and web server 110. Router 112 may be configured to assign or select an available or "healthy" computer 122 from computer cluster 120 to perform the requested function. In certain embodiments, the selection or assignment may be based on an algorithm configured to realize efficiency or performance based on the capabilities of the available computers 122 and the requested functions. In certain embodiments, the selection or assignment can be random. Router 112 can use any applicable random assignment or selection methodology. For example and not limitation, in some embodiments, router 112 can use Binary Search, QuickSort, MergeSoft, or HeapSort. A computer 122 may be deemed "healthy" or available if it meets certain requirements. In some embodiments, computer 122 may be deemed available if it has available memory, such as random access memory (RAM). In some embodiments, computer 122 may be deemed available if it has available processing units. In some embodiments, computer 122 may be deemed available if it has available cycles or available tasks. In some embodiments, computer 122 may be deemed available if it is capable of managing an additional concurrent connection. The capability to manage an additional concurrent connection may refer to the number of processing units available within the computer cluster 120. For example and not limitation, in a cluster having five computers and each computer having two CPUs, the cluster would be capable of managing ten concurrent connections, and each computer would be capable of managing two concurrent connections. In certain embodiments, computer 122 may be deemed available only if it meets some or all of these or other predetermined characteristics.

In certain embodiments, router 112 may determine which computers 122 of computer cluster 120 are available when a function is requested. In some embodiments, router 112 may keep record of which computers 122 of computer cluster 120 are available. In some embodiments, router 112 may determine the availability of computers 122 of computer cluster 120 according to a predetermined schedule. For example and not limitation, router 112 may determine the availability of computers 122 of computer cluster 120 every 10 seconds, every 5 seconds, every second, or every 0.1 seconds. The present disclosure is not limited to a particular refresh rate of computer availability, however. Some embodiments may determine the availability of computers 122 at faster or slower rates than those expressly disclosed herein.

In certain embodiments, various components of organization 108 (e.g., web server 110, router 112, storage device 116, and computers 122 of computer cluster 120) can be in electrical communication with some or all other components of organization 108 via local network 114. In some embodiment, some or all components may be in direct communication with one another, bypassing local network 114. In some embodiments, network 104 and/or local network 114 may be configured as a communication interface. In certain embodiments, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to some embodiments, router 112 can be configured to randomly assign or select an available computer 122 of computer cluster 120 to perform a requested function. Thus, in some embodiments, router 112 may first determine the availability of computers 122 of computer cluster 120 and may then randomly select one or more computers 122 from the available computers 122 to execute the requested function. For example, referring to FIG. 2, computer cluster 120 may comprise computers 122a-122av. Persons of skill in the art will recognize that computer cluster 120 may comprise more or fewer computers than those shown in FIG. 2. Computer cluster 120 may comprise unavailable computers 122 (depicted as shaded boxes in FIG. 2 and more specifically, comprising computers 122e, 122k, 122l, 122r, 122ac, 122ae, 122af, 122ai, 122am, 122ar, 122as, 122at, 122au, and 122av), which may be computers 122 that fail one or more requirements of a "healthy" computer 122. Computer cluster 120 may also comprise available or "healthy" computers 122 (depicted as unshaded boxes in FIG. 2).

The randomized selection of available computers afforded by router 112 may be useful to increase the speed with which the overall system is able to process function requests. For example, were router 112 to employ a complicated algorithm to determine the "best" computer to execute the requested function, router 112 may require a substantial amount of time—such as 20 milliseconds to several hours—to query the computers and compute the algorithm. The time required by a scheme employing a complicated algorithm will vary depending on, for example, what actions are required to execute the requested function, the amount of data on which the requested function is to be executed, and the quality or efficiency of the hardware (e.g., computers 122) to be used to execute the requested function. Should such a wait time exist and should a user request the execution of a large number of functions and/or multiple users request the execution of functions at the same or nearly the same time, this wait time may propagate and cause the system to significantly increase the processing time of some or all function requests. As an added benefit, organization 108 may also realize energy savings due to the comparative reduction in necessary computations associated with randomized selection of available computers.

In certain embodiments, router 112 may be configured to select computers 122 by request. That is, router 112 may be configured to select a single computer 122 to perform all functions requested by the user. For example, user device 102 may request a batch of five functions to be executed, and router may select computer 122w to execute all five requested functions. In some embodiments, router 112 may be configured to select computers 122 by function. That is, router 112 may be configured to select a computer 122 for each requested function of a batch of requested functions. For example, user device 102 may request a batch of five functions to be executed, and router 112 may select computers 122c, 122n, 122t, 122u, and 122ao to each perform one of the five requested functions. Because assignment may be randomized, however, some computers 122 may be selected to execute more than one function of a batch of requested functions. Thus, as another example, user device 102 may request a batch of five functions to be executed, and router 112 may select computers 122c, 122n, 122t, and 122u to each perform one of the five requested functions and may select computer 122ao to perform two of the five requested functions. Embodiments in which router 112 is configured to randomly select a single computer 122 to perform an entire batch of function requests may provide a comparatively faster processing time for small batches of function requests as router 112 is required to place only a single network call (i.e., a single call to the single computer randomly selected to execute the batch of requested functions). In contrast, embodiments in which router 112 is configured to randomly select a computer 122 for each function from a batch of requested functions may provide a comparatively faster processing time for large batches of function requests as such an embodiment provides the possibility of multiple computers 122 being selected to execute the multiple requested functions, which may permit the requested functions to be executed simultaneously or nearly simultaneously, rather than sequentially.

Referring to FIG. 3, some embodiments may include a second database 316 that is separate and distinct from first storage device 116. According to some embodiments, second database 316 may have some or all of the characteristics and/or features of first storage device 116. In some embodiments, the secure data of organization 108 may be located on first storage device 116, and the logic associated with the user account associated with user device 102 (and all other user accounts) may be located on second database 316. Persons of skill in the art will appreciate that second database 316 may refer to a single memory device, such as a hard drive, but may also collectively refer to multiple, separate memory devices in communication with one another and/or local network 114 of organization 108. In certain embodiments, the saved logic of the user account associated with user device 102 may be saved on a shared memory segment of second database 316 such that each computer 122 in computer cluster 120 can access the saved logic associated with the user account.

According to some embodiments, computer 122 can configured such that, once it is selected by router 112 to execute a requested function, computer 122 can access certain secure data accessible by user devices 102 associated with a particular user account (e.g., from first storage device 116) and the stored logic associated with the user account (e.g., from either first storage device 116 or second database 316, depending on the embodiment). Computer 122 may be configured to then execute the requested function based on the stored logic associated with the user account and the data accessible by user devices 102 associated with a particular user account. By executing the requested function, computer 122 can generate an output. Computer 122 can then transmit the output back to user device 102. In some embodiments, computer 122 can transmit the output directly to user device 102 via network 104. In some embodiments, computer 122 can transmit the output directly to user device 102 via a combination of local network and network 104. In some embodiments, computer 122 can transmit the output to router 112 (e.g., via local network 114), and router 122 can transmit the output to user device 102 (e.g., via network 104).

Referring to FIG. 4, some embodiments may be configured to simultaneously or nearly simultaneously perform functions for multiple users. For example, a first user device 102 and a second user device 402 may be simultaneously connected to organization 108's system such that both user devices 102, 402 can each simultaneously request one or more functions to be executed. Router 112 can select various computers 122 from computer cluster 120 to perform the requested functions from both user devices 102, 402. In some embodiments, each computer 122 is configured to simultaneously or nearly simultaneously perform multiple functions, such that a single computer 122 can perform one or more functions requested by first user device 102 and one or more functions requested by second user device 402. In some certain embodiments, some or all computers 122 of computer cluster 120 are capable of performing only a single function at a time. In some embodiments, router 112 may assign a requested function to a computer 122 only if that computer 122 is not already executing a requested function and meets all other requirements of an available or "healthy" computer. In certain embodiments, if a computer 122 is already processing a first requested function and router 112 assigns a second requested function to that computer 122, router 112 may place the second requested function in a queue for that computer 122.

In certain embodiments, computers 122 of computer cluster 120 may be divided into exclusive sections or subgroups of computers 122. For example, in some embodiments, computer cluster 120 may be divided into a first group of computers 122 and a second group of computers 122. Preference may be given to some user accounts over others based on factors desirable to organization 108. For example, a larger subscription fee may be attributed to a group comprising faster and/or more powerful computers 122. In some embodiments, a first group of computers 122 may be configured to access only confidential data, and a second group of computers 122 may be configured to access only nonconfidential data. Persons of skill in the art will recognize that computers 122 of the computer cluster may be grouped or divided according to any desired factor or factors.

In some embodiments, resources of computer cluster 122 may be limited or capped for a particular user account. In some embodiments, resources of computer cluster 122 may be limited or capped in relation to the current usage or availability of resources of computer cluster 122. For example, in some embodiments, a particular user may be capped at a maximum amount of processing power. In some embodiments, the maximum amount of resources available to a particular user (or any user) may be capped if the system receives function requests over a predetermined number or beyond a predetermined threshold of estimated processing power required to execute all received function requests.

In some embodiments, one, some, or all users may be limited to the amount of function requests that may be requested by the one, some, or all users at the same time or during a predetermined period of time. For example, in some embodiments, the amount of function requests for a single user may be limited to the maximum number of functions and/or the maximum amount of processing that may be executed by computer cluster 120 at a single time. In some embodiments, the number of function requests for a single user may be limited to the number of functions that may be executed by a predetermined portion of computer cluster 120 at a single time. In some embodiments, the number of function requests for a single user device 102 or a single user account may be limited by a predetermined threshold of estimated processing power required to execute all received function requests. In some embodiments, a user device 102 and/or user account may be limited to making a predetermined number of function requests at a single time or during a predetermined period of time. In some embodiments, a user device 102 and/or user account may be limited to making a user may be limited to making function requests beyond a predetermined threshold of estimated processing power required to execute all received function requests made at a single time or during a predetermined period of time.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi® enabled network, a satellite-based network any wired network, any wireless network, etc., for communication with external devices and/or systems, for example, via public cloud service.

Figure 5:
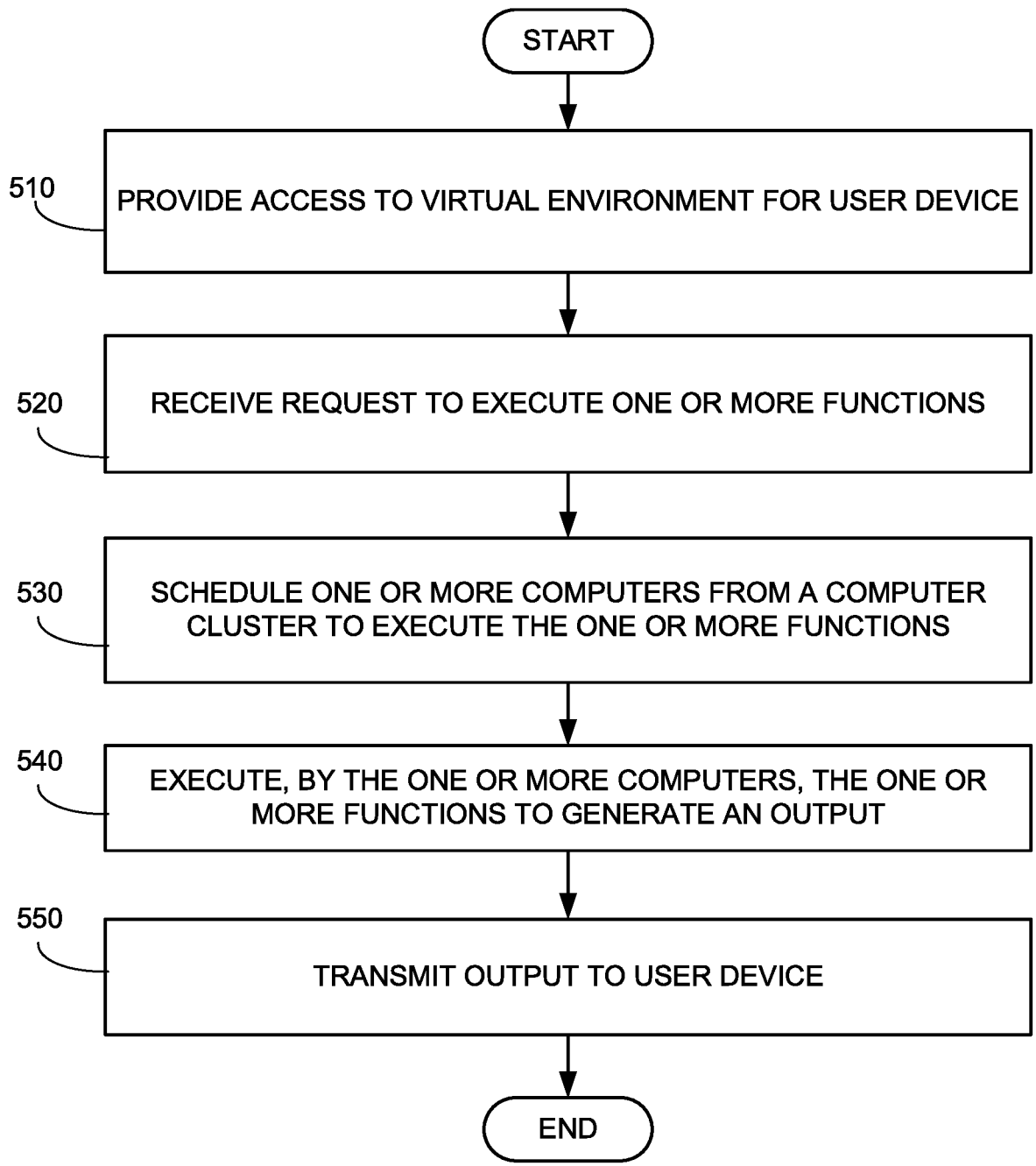
FIG. 5 is a flowchart of an example method for providing, to a third party, secure access to data associated with an organization, according to some embodiments of the disclosed technology.
Figure 6:
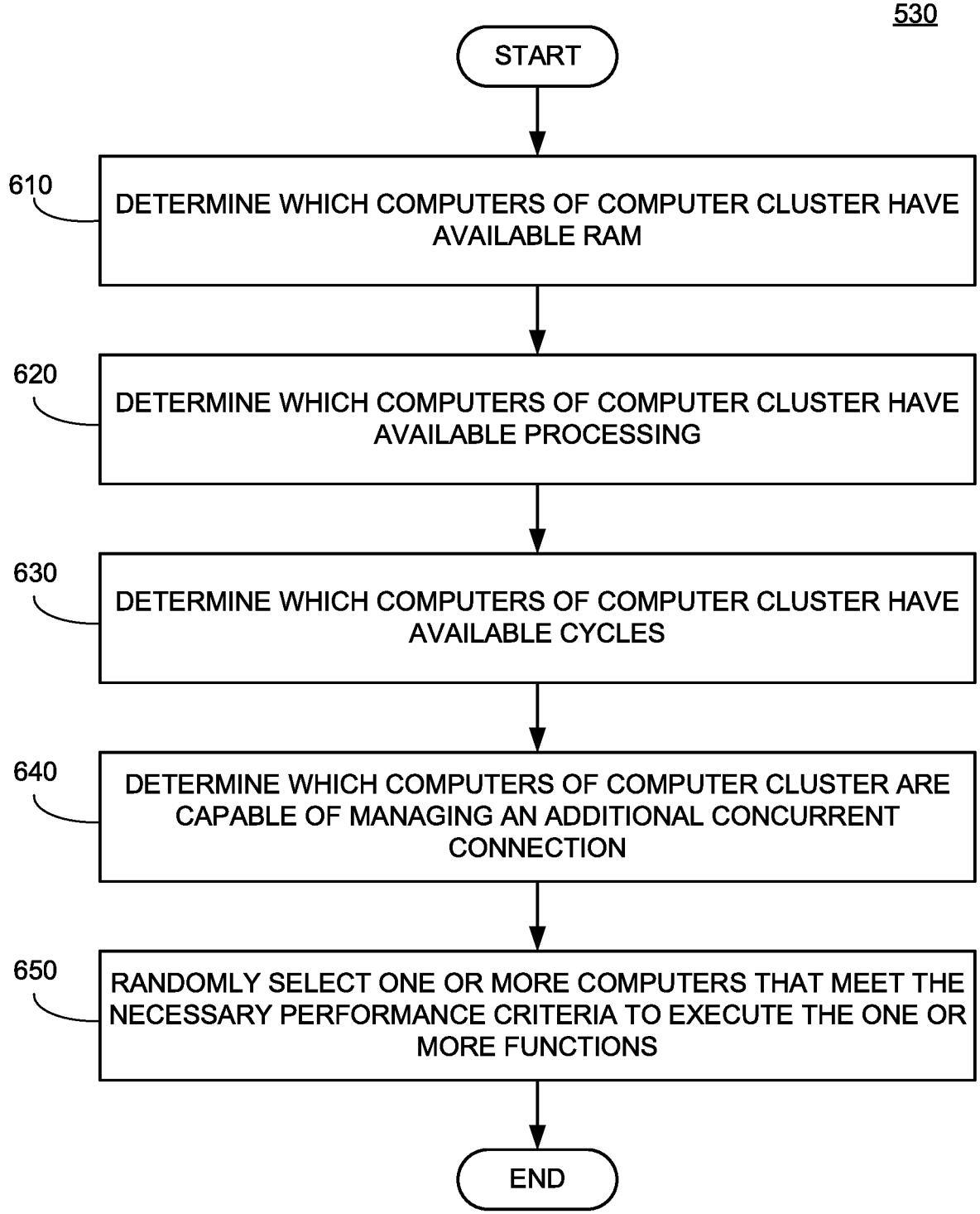
FIG. 6 is a flowchart of an example method for randomly selecting one or more computers to execute one or more requested functions, according to some embodiments of the disclosed technology.

It will be understood that the various steps shown in FIGS. 5 and 6 are illustrative only, and that steps may be removed, other steps may be used, or the order of steps may be modified.

Referring to FIG. 5, a system 500 incorporating various aspects of the disclosed technology may be configured to provide 510 access to a user interface for a user of a user device. In some embodiments, system 500 can receive 520 a request from the user device to execute one or more functions. In certain embodiments, system 500, such as by a router or scheduler, can schedule 530 one or more computers from a computer cluster to execute the one or more requested functions. As described above, the router may be configured to randomly schedule 530 the one or more computers. In some embodiments, the router may be configured to schedule by request (i.e., assign an entire batch of function requests as a whole). In some embodiments, the router may be configured to schedule by function. In certain embodiments, system 500 may execute 540, by the one or more scheduled computers, the one or more functions, generating an output or multiple outputs, as the case may be. As described above, in some embodiments, a single computer may be configured to execute a single requested function at a time. In some embodiments, a single computer may be configured to simultaneously or nearly simultaneously execute multiple requested functions. In certain embodiments, multiple computers may simultaneously or nearly simultaneously execute multiple requested functions. In some embodiments, system 500 can transmit 550, directly or indirectly, the one or more outputs to the user device.

Referring to FIG. 6, aspects of scheduling 530 are described in more detail. According to some embodiments, system 600, such as by a router, may determine 610 which computers of the computer cluster have available RAM. In some embodiments, system 600, such as by a router, may determine 620 which computers of the computer cluster have available processing. In some embodiments, system 600, such as by a router, may determine 630 which computers of the computer cluster have available cycles. In some embodiments, system 600, such as by a router, may determine 640 which computers of the computer cluster are capable of managing an additional concurrent connection. In some embodiments, system 600, such as by a router, may randomly select 650 one or more computers that meet the above criteria (as discussed above with respect to available or "healthy" computers) to execute to one or more functions.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Exemplary Use Cases

The following exemplary use cases describe examples of a typical user flow pattern. They are intended solely for explanatory purposes and not limitation. A financial service provider may permit multiple third parties (e.g., affiliates or merchants) the ability to retrieve secure data that is owned or hosted by the financial service provider (e.g., secure data that is saved on a database associated with the financial service provider) such that the third parties can perform calculations, computations, or other actions based on the secure data. The data that is retrievable by, or otherwise available to, a particular third party, may differ from that retrievable by, or otherwise available to, other third parties. To permit a third party to perform the desired calculations, computations, or other actions based on the secure data available to that particular third party, the financial service provider may provide a user interface to the third party. The user interface can be located on (e.g., provided from), for example, a web server associated with the financial service provider and can be accessed by the third party via a URL (e.g., via HTTPS communication). The user interface can also require authentication of a user account, such that successful authentication of a user device can associate the user device with the corresponding user account. The user interface can include a graphical user interface viewable by the third party and can provide a field in which computer programs, computer scripts, tools, raw computer code, or other logic (collectively, logic) can be uploaded, from or by the user device and via the user interface, to a database associated with the financial service provider. Thus, the third party is able to transfer logic from a database associated with the third party to a database associated with the financial service provider such that a complete copy of the third party's logic is saved on a database associated with the financial service provider.

The user interface can also include a field in which the third party can request a function (e.g., an action based on or caused by performance or execution of the uploaded logic) to be executed. The user interface can permit the third party to specify which function of a plurality functions should be executed and can also include a field in which the third party can specify which portion or portions of the secure data available to that particular third party should be included in the execution of the requested function.

Upon receipt of a function request by the financial service provider's system (e.g., at a web server associated with the financial service provider), a router can select or schedule one or more computers from a computer cluster to execute the requested function based on the requested selection of secure data. The router may select the computers randomly and only from those computers that are available or "healthy" (e.g., computers that have the attributes and capabilities necessary to execute functions). Once selected, a computer may access the requested selection of secure data from a database associated with the financial service provider and the third party's logic from a database associated with the financial service provider. The computer may then execute the requested function using the third party's logic and based on the requested selection of data, generate an output. The computer may then, directly or via one or more other elements of the financial service provider's organization, transmit the output to the user device. The output may be transmitted to the user device via the user interface.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing, to a third party, limited access to secure organization data associated with an organization, the method comprising:
   providing an interface configured to enable a remote device associated with the third party to (i) transmit computer-executable instructions to a storage device and (ii) request execution of at least some of the computer-executable instructions, the interface being configured to store data on a storage device;
   saving, on the storage device and via the interface, the computer-executable instructions from the remote device;
   receiving, from the remote device via the interface, a request to execute at least some of the computer-executable instructions in relation to a portion of the secure organization data, the secure organization data being stored on the storage device and secured within a network associated with the organization; and
   instructing a working computer to:
     access, from the storage device, the at least some of the computer-executable instructions and at least some of the portion of the secure organization data;
     execute, by the working computer, the at least some of the computer-executable instructions based on the at least a portion of the secure organization data to generate an output; and
     transmit the output to the remote device.

2. The method of claim 1 further comprising:
   responsive to receiving the request, scheduling, by a router, the working computer from a computer cluster associated with the organization to perform the at least some of the computer-executable instructions, the scheduling comprising randomly selecting the working computer from the computer cluster.

3. The method of claim 2 further comprising:
   prior to scheduling the working computer from the computer cluster, determining that the working computer is capable of performing the at least some of the computer-executable instructions by determining the working computer has available RAM, available processing, and available cycles and is capable of managing an additional concurrent connection.

4. The method of claim 1 further comprising:
   determining the portion of the secure organization data based on permissions associated with a third-party account associated with the remote device; and
   preventing the request from the remote device from causing execution of the at least some of the computer-executable instructions in relation to any secure organization data other than the portion of the secure organization data.

5. The method of claim 4, wherein determining the portion of the secure organization data comprises verifying authentication information received from the remote device, the authentication information being associated with the third-party account.

6. The method of claim 4, wherein the portion of the secure organization data is a first data tier of a plurality of data tiers.

7. The method of claim 6, wherein the first data tier comprises confidential data of the secure organization data.

8. The method of claim 6, wherein the first data tier comprises nonconfidential data of the secure organization data.

9. The method of claim 6, wherein the working computer is a first working computer, the third-party account is a first third-party account of a first plurality of third-party accounts, and the computer-executable instructions are first computer-executable instructions,
wherein the first data tier of the plurality of data tiers is accessible by the first working computer executing at least some of the first computer-executable instructions associated with the first third-party account of the first plurality of third-party accounts and a second data tier of the plurality of data tiers is accessible by a second working computer executing at least some of second computer-executable instructions associated with a second third-party account of a second plurality of third-party accounts.

10. A system for providing, to a third party, secure access to secure data associated with an organization, the system comprising:
a storage device storing:
raw user data associated with the organization, the raw user data being (i) a predetermined portion of the secure data that is predetermined based at least in part on permissions associated with a third-party account of a plurality of third-party accounts and (ii) accessible by each computing device of a cluster of computing devices; and
logic associated with the third-party account;
a cluster of computing devices associated with the organization, each computing device of the cluster of computing devices being in communication with the storage device and a processing power of each computing device of the cluster of computing devices being partitioned into a plurality of processing units, each processing unit of the plurality of processing units being assigned to a corresponding third-party account of the plurality of third-party accounts; and
an interface configured to receive a function request from a third-party device associated with the third-party account, the third-party device being remotely located and the function request being indicative of a request to execute a function based on at least some of the logic and in relation to at least some of the raw user data.

11. The system of claim 10 further comprising:
a scheduler configured to, upon receipt of a function request from the third-party device and via the interface, select a scheduled computing device from the cluster of computing devices to perform the function request, the scheduled computing device selected from among a plurality of computing devices of the cluster of computing devices that are determined to be available to execute the function request,
wherein at least one computing device of the cluster of computing devices is configured to generate an output by executing a function request received from the third-party device and via the interface based at least in part on at least some of the logic and at least some of the raw user data.

12. The system of claim 10, wherein each processing unit of the plurality of processing units has an approximately equal size.

13. The system of claim 10, wherein the processing units of the plurality of processing units have different sizes.

14. The system of claim 10, wherein the third-party device is a first third-party device and the third-party account is a first third-party account, and
wherein each computing device of the cluster of computing devices is configured to concurrently execute a first function request from the first third-party device associated with the first third-party account and a second function request from a second third-party device associated with a second third-party account of the plurality of third-party accounts.

15. The system of claim 14, wherein each computing device of the cluster of computing devices is configured to concurrently execute (i) the first function request using a first processing unit of the plurality of processing units, the first processing unit being assigned to the first third-party account, and (ii) the second function request using a second processing unit of the plurality of processing units, the second processing unit being assigned to the second third-party account.

16. The system of claim 14 further comprising a scheduler configured to:
select a scheduled computing device from the cluster of computing devices to perform the function request, the scheduled computing device selected from among a plurality of computing devices of the cluster of computing devices that are determined to be available to execute the function request, the selecting comprising:
identifying a plurality of available computing devices of the cluster of computing devices, an available computing device being a computing device capable of performing the function request; and
selecting the scheduled computing device from the plurality of available computing devices.

17. A system for providing secure access to secure data associated with an organization, the system comprising:
an organization network associated with the organization, the organization network comprising:
a cluster of computing devices; and
a memory storing raw user data, the raw user data being (i) a predetermined portion of the secure data that is predetermined based at least in part on permissions associated with a user account and (ii) accessible by each computing device of the cluster of computing devices; and
a user interface stored on a web server associated with the organization, the user interface comprising:
an upload functionality through which instructions can be received at the organization network from a user device associated with the user account, the user device being located outside of the organization network and the instructions comprising computer code indicative of one or more functions to be performed on at least some of the raw user data; and
a request functionality through which the user device can request a function to be performed based at least in part on at least some of the instructions and at least some of the raw user data.

18. The system of claim 17 further comprising a router configured to:
receive one or more function requests from the user device and via the user interface, each of the one or more function requests corresponding to one or more requested functions; and
schedule a working computing device schedule a working computing device from a plurality of available computing devices of the cluster of computing devices to execute the one or more requested functions by:

identifying the plurality of available computing devices of the cluster of computing devices, an available computing device being a computing device is capable of performing at least one function request of the one or more function requests; and for each individual function request of the one or more function requests, randomly selecting the working computing device from the plurality of available computing device of the cluster of computing devices to perform the function request of the one or more function requests, wherein each computing device of the cluster of computing devices is configured to:

execute one or more requested functions received from the user device and via the user interface; and provide an output to the user device and via the web server and the user interface.

19. The system of claim 18, wherein the router is configured to randomly select a first computing device of the cluster of computing devices to perform a first function request of the one or more function requests and randomly select a second computing device of the cluster of computing devices to perform a second function request of the one or more function requests, the second computing device being different from the first computing device.

20. The system of claim 18, wherein the router is configured to select a single computing device of the cluster of computing devices to perform all function requests of the one or more function requests.

* * * * *